United States Patent [19]

Fogg et al.

[11] 4,420,573

[45] Dec. 13, 1983

[54] METHOD OF TREATING WATER-IN-OIL DISPERSIONS

[75] Inventors: Sidney G. Fogg, Ashtead; Frank C. Robertson, Woking; Douglas Wilson, Godalming, all of England

[73] Assignee: The British Petroleum Company p.l.c., London, England

[21] Appl. No.: 359,054

[22] Filed: Mar. 17, 1982

[30] Foreign Application Priority Data

Mar. 28, 1981 [GB] United Kingdom ................ 8109803
Oct. 24, 1981 [GB] United Kingdom ................ 8132137

[51] Int. Cl.³ .............................................. C02B 9/02
[52] U.S. Cl. ................................... 523/333; 210/924; 210/925; 523/334; 523/335; 523/336; 523/339; 524/917
[58] Field of Search ................ 524/917; 523/333, 334, 523/335, 336, 339; 210/924, 925

[56] References Cited

U.S. PATENT DOCUMENTS

| | | | |
|---|---|---|---|
| 1,735,547 | 11/1929 | Reel et al. | 523/336 |
| 1,887,774 | 11/1932 | Meinzer | 210/923 |
| 2,955,096 | 10/1960 | White | 523/334 |
| 3,131,160 | 4/1964 | Alexander et al. | 523/334 |
| 3,536,615 | 10/1970 | Bunn | 210/925 |
| 4,052,353 | 10/1977 | Scanley | 523/335 |
| 4,206,080 | 6/1980 | Sato et al. | 210/925 |
| 4,265,673 | 5/1981 | Pace et al. | 524/917 |

FOREIGN PATENT DOCUMENTS 1340333 12/1973 United Kingdom ................ 210/924

Primary Examiner—Ronald W. Griffin
Attorney, Agent, or Firm—Morgan, Finnegan, Pine, Foley & Lee

[57] ABSTRACT

A method of treating salt water-in-oil dispersions comprises mixing with the dispersion a latex of a rubber having a high wet gel strength. The incorporation of the latex into the dispersion causes exudation of water from the dispersion with resulting thickening. If sufficient latex is used the dispersion may be transformed into a solid. Suitable rubbers include natural rubber, polychloroprene rubber, butadiene acrylonitrile rubber, styrene butadiene rubber and poly (methyl methacrylate) graft natural rubber.

The tackiness of solids formed using for example a natural rubber latex can be reduced by using in addition to the natural rubber latex, a latex of a low or zero wet gel strength polymer e.g. PVC, poly (vinyl acetate) or polystyrene. The effectiveness of the method of treatment may be improved by the use of a suitable compatible solvent e.g. toluene or a filler such as a clay filler.

12 Claims, No Drawings

METHOD OF TREATING WATER-IN-OIL DISPERSIONS

The present invention relates to a method of treating dispersions of water-in-oil.

The majority of crude oils, as well as some fuel oils, will, if spilt on water, form a relatively stable, viscous water-in-oil emulsion, under suitable conditions. The rate of formation and physical characteristics of such water-in-oil emulsions, commonly known as "chocolate mousse", will be dependent upon the intensity and duration of agitation and the temperature of the oil and water mixture. Emulsions will be formed even under calm sea conditions given sufficient time, and once formed are difficult to recover and handle. The inevitable time lag between the occurrence of an oil spill and the completion of the recovery operations means that water-in-oil emulsions are frequently formed at oil spill incidents. These viscous water-in-oil emulsions are difficult to recover from the surface of the water on which they float or from surfaces such as beaches onto which they may be washed. There is therefore a need for a method of recovering these viscous materials or of transforming them into a form which may be more easily handled.

It has now surprisingly been found that certain aqueous latices of rubber may be easily incorporated into dispersions of salt water in oil, even though the continuous phase is an oil phase, and that these selected latices will surprisingly cause exudation of water from the dispersion with resulting thickening of the dispersion. If sufficient latex is used it is possible to convert the dispersion into a solid material which may be handled more easily than the original water-in-oil dispersion.

Thus according to the present invention a process for treating a dispersion of salt water-in-oil comprises mixing the dispersion with a latex of a rubber having a high wet gel strength.

Any water-in-oil dispersion (i.e. a dispersion in which the oil is the continuous phase) may be treated according to the present invention provided that the water is salt water or if it is fresh water that salt, e.g. sodium chloride, is added to it. The process of the present invention is particularly useful for the treatment of the so-called "chocolate mousse" i.e. dispersions of sea water in crude oil or in products derived from crude oil which are relatively involatile at normal ambient temperature (about 20° C.). The quantity of water present in the "chocolate mousse" may be as much as 80% by volume and the present invention is particularly suitable for the treatment of water-in-oil dispersions comprising from 20 to 80% and more particularly 50–80% of water by volume.

A dispersion formed as a result of incorporating fresh water into oil can also be treated according to the present invention but in this case it is necessary to add salt to the dispersion. The salt may be added to the dispersion as an aqueous solution but is preferably added as a solid. The salt may be added prior to or simultaneously with the rubber latex. Preferably the fresh water is treated with greater than 3% or more preferably greater than 5% by weight of salt. Throughout this specification references to a salt water-in-oil dispersion should be taken to mean a dispersion formed as a result of incorporating salt water into oil or a dispersion formed as a result of incorporating fresh water into oil which dispersion is treated with salt.

The rubber latex used is a latex of a rubber which has a high wet gel strength. The wet gel strength is a measure of the strength with which the coagulated latex particles adhere together when wet and before curing. Rubbers having a suitably high wet gel strength include natural rubber, polychloroprene rubber, styrene butadiene rubber and butadiene—acrylonitrile polymer rubber.

A particularly suitable rubber having a high wet gel strength for use in the method according to the present invention is a modified natural rubber having from 5 to 20% by weight poly (methyl methacrylate) chains chemically attached to the rubber. Latices of such rubbers are known. For example the properties and applications of latices of natural rubber having poly (methyl methacrylate) attached to the natural rubber are reviewed in Volume 1, chapter 4 of "Block and Graft Copolymers of Natural Rubber" Ed. Ceresa R. J., Wiley, 1973. Latices of these modified natural rubbers may be prepared by graft polymerisation of methyl methacrylate monomer in natural rubber latex. The polymer comprises a natural rubber 'back-bone' having a small number of relatively long side chains of poly (methyl methacrylate). Commonly used materials contain 30% or more of poly (methyl methacrylate) however for use in the present invention, the rubber particles should have from 5 to 20% by weight of the poly (methyl methacrylate).

The rubber latex is preferably an anionic latex. Preferably the latex has a high solid content in order to avoid introducing excessive amounts of additional water into the dispersion. Preferably the latex has a solid concentration of from 40 to 60% by weight.

The latex and the salt water-in-oil dispersion may be mixed together in any convenient way which gives adequate mixing of the latex into the dispersion. For example, simple manual agitation may be sufficient to adequately mix the latex and the dispersion. This means that small patches of "chocolate mousse" on a beach may be treated by the process of the present invention without the necessity for the use of complex machinery which may be expensive and difficult to transport to where it is needed.

The incorporation of the latex into the salt water-in-oil dispersion causes the dispersion to exude water and to thicken. The quantity of latex added will depend on the degree of thickening required. A sufficient amount of the latex will generally be used to transform the dispersion into a firm solid. In the presence of sufficient latex a mass of salt water-in-oil dispersion will be broken down into firm lumps which make its subsequent recovery easier.

The quantity of latex required for any given degree of thickening may be determined by simple tests. The amount of latex of a rubber, having a high wet gel strength, which is added to a salt water-in-oil dispersion is preferably sufficient to give an amount of high wet gel strength rubber in the dispersion of from 5 to 30% and more preferably from 8 to 24% by weight of the weight of the dispersion since the solid concentration of the latex is preferably from 40 to 60% by weight, the amount of the latex is typically from 10 to 50% and more preferably from 20 to 40% by weight of the weight of the dispersion.

When a latex of certain of the high wet gel strength rubbers is used in the process of the present invention, a solid material may be formed which, although more tractable than the original salt water-in-oil dispersion, is rather tacky. This is particularly true of the use of a latex of natural rubber. This tackiness may be overcome or at least mitigated by the use of a latex of a low or zero wet gel strength polymer such as a PVC latex, in combination with the latex of the rubber having a high wet gel strength.

Thus the present invention includes a method for treating a dispersion of salt water-in-oil which comprises mixing with the dispersion of a latex a high wet gel strength rubber and a latex of a polymer having a low or zero wet gel strength, the amount of the latex of the polymer having a low or zero wet gel strength being from 1 to 35% by weight of the combined weight of the polymer and rubber.

Suitable polymers having a low or zero wet gel strength are polystyrene, poly (vinyl acetate) and PVC although PVC is the preferred polymer. The latex of the polymer having a low or zero wet gel strength is preferably stabilised with one or more anionic surfactants and preferably has a solid concentration of from 40 to 60% by weight.

The latex of the high wet gel strength rubber (e.g. natural rubber latex) and the latex of the low or zero wet gel strength polymer (e.g. PVC latex) may be mixed together prior to being mixed with the salt water-in-oil dispersion. Alternatively, the latices may be added separately to the dispersion either sequentially or simultaneously.

The incorporation of the two latices into a salt water-in-oil dispersion causes the dispersion to exude water and thicken. The quantity of the latex of the low or zero wet gel strength polymer which is required to be used with the latex of the high wet gel strength rubber to give a non-tacky solid product may be determined by simple tests.

The combined amount of the high wet gel strength rubber and the low or zero wet gel strength polymer added to the dispersion is preferably from 6 to 35% by weight and more preferably 8 to 24% by weight of the weight of the dispersion. Thus, since the solids content of both the polymer latex and the rubber latex is from 40 to 60% by weight, the combined amount of the latices added to the dispersion is typically from 10 to 60% and more preferably from 20 to 40% by weight of the weight of the dispersion. The amount of the low tack additive i.e. the low or zero wet gel strength polymer added to the dispersion is from 1 to 35% and preferably from 10 to 25% by weight of the combined weight of the polymer and rubber. Although even small amounts of PVC can improve the tackiness of the product, preferably the quantity of PVC used is greater than 0.2% by weight of the weight of the dispersion.

The use of the modified natural rubber latex, i.e. a latex of poly (methyl methacrylate) graft natural rubber in the process of the present invention results in a less tacky product than when a simple natural rubber latex is used. However, the use of a latex having a low or zero wet gel strength polymer, e.g. PVC latex, in combination with the modified natural rubber latex can result in a product which is even less tacky.

Thus a preferred method of treating a dispersion of salt water-in-oil according to the present invention comprises mixing with the dispersion, a latex of a natural rubber having from 5 to 20% by weight of methyl methacrylate polymer chains chemically attached to the rubber and a PVC latex, the combined amount of the rubber and PVC being from 10 to 25% by weight of the combined weight of the polymer and rubber in the latices.

It has also been found that the effectiveness of treating a salt water-in-oil dispersion with a latex of certain high wet gel strength rubbers may be improved by the addition of a hydrophobic solvent and/or the addition of a filler.

The solvent is preferably one which is compatible with the rubber i.e. one which swells the rubber. A suitable compatible solvent is toluene which may be added to the latex prior to adding the latex to the dispersion. The quantity of solvent used may be from 5 to 50% more particularly from 10 to 20% by weight of the latex.

The filler is preferably a filler which is wetted by the latex and may, for example, be a clay filler conventionally used in rubber formulations.

The invention will now be illustrated by reference to the following examples:

EXAMPLE 1

An artificial "chocolate mousse" was prepared by adding together sea water and Kuwait crude oil in a weight ratio of 70:30 and stirring the mixture for approximately 15 minutes. The resulting product was a viscous dispersion of water-in-oil (the oil being the continuous phase).

An anionic polychloroprene latex having a solids content of 58% wt/wt produced by Distugil S. A. under the trade name Butaclor L632 was added slowly to a portion of the artificial "chocolate mousse" while the "mousse" was stirred slowly by hand with a spatula. The quantity of polychloroprene latex added was 15% wt/wt of "mousse" i.e. the amount of polychloroprene added was 8.7% wt/wt of the dispersion. The latex was rapidly incorporated into the "mousse" and after about 30 minutes the mixture began to thicken and exude water. The above experiment was carried out at normal ambient temperatures (about 20° C.). The mixture was left overnight and became particulate and firm.

EXAMPLES 2 TO 16

To 10 g samples of the same artificial "chocolate mousse" as prepared in Example 1 were added 4 g of a mixture of natural rubber latex and poly vinyl chloride (PVC) latex.

The natural rubber latex was a concentrated natural rubber latex supplied by Symmintons Limited having a solids concentration of 51% wt/wt and the PVC lates was a latex supplied by BP Chemicals under the trade name Breon 4001 which had a solids concentration of 51.5% wt/wt. The amount of PVC in the mixture of latices varied from 1% to 90% by weight (Examples 3 to 16) and a 10 g sample of the "chocolate mousse" was treated with 4 g of natural rubber latex with no PVC (Example 2).

The mixtures of "mousse" and latices were left for 24 hours and then the products were subjected to a simple test designed to distinguish between products of similar tackiness. 5 g of each product was sandwiched, in an area of 9 cm$^2$, between a piece of stiff cardboard and a piece of stiff aluminium foil. A weight of 20 kg was applied for 60 seconds to the test piece. The "sandwich" was then positioned vertically and a 200 g weight attached to the foil. The time taken for the foil to peel from the product was measured and these peel times are given in Table 1.

TABLE 1

Effect of the amount of PVC latex in the mixture of latices

| Example No | Amount of PVC latex in the mixture of latices (% by wt) | Description of product after 24 hours | Peel time After 24 Hours (S) |
|---|---|---|---|
| 2 | 0 | Tacky solid | 65 |
| 3 | 1 | | 52 |
| 4 | 2.5 | Slightly tacky solid | 33 |
| 5 | 5 | Slightly tacky solid | 27 |
| 6 | 7.5 | | 19 |
| 7 | 10 | Non tacky solid | 0 |
| 8 | 20 | Non tacky solid | 0 |
| 9 | 30 | Slightly tacky solid | 20 |
| 10 | 35 | Slightly tacky solid | 48 |
| 11 | 40 | | 98 |
| 12 | 50 | Tacky solid | 130 |
| 13 | 60 | | 168 |
| 14 | 70 | Solid not formed | — |
| 15 | 80 | Solid not formed | — |
| 16 | 90 | | — |

Table 1 shows that a tacky solid may be produced using a latex of natural rubber alone and that a non-tacky solid may be obtained if the amount of PVC latex in the mixture of latices is from 10 to 20% by weight and the combined amount of the latices added to the "chocolate mousse" is 40% by weight of the weight of the "mousse". Example 3 shows that at this treatment level at little as 1% by weight of the PVC latex in the mixture of latices i.e. 0.21% PVC by weight of the weight of the dispersion results in an improvement in the tackiness of the product as compared with treating the "mousse" with natural rubber latex alone. However if the amount of PVC latex in the mixture of latices is greater than or equal to 40% by weight then the peel time is greater than that for natural rubber latex alone i.e. the addition of PVC latex above about 36% by weight does not improve the tackiness of the product. If the mixtures of latices comprises more than 70% by weight of PVC latex the product does not form a handleable solid within 24 hours. Thus the addition of the PVC latex was an improvement over the use of natural rubber alone, only if the natural rubber latex was the major component.

EXAMPLE 17

Four 10 g samples of the same artificial "chocolate mousse" as used in Example 1 were treated with 4 g, 3 g, 2 g and 1 g respectively of a latex mixture comprising 80% wt/wt natural rubber latex and 20% wt/wt PVC latex. The latices were the same as those used in Example 2.

The mixture of latices mixed readily with the "mousse" at all treatment levels and solidification occurred within 5 minutes. Although the solid could be easily handled within one hour of mixing the latices and the dispersion, it continued to exude water and after about 24 hours 80 to 90% of the total amount of water and had been exuded. The peel times after 24 hours for the four treatment levels are given in Table 2.

TABLE 2

Effect of the combined amount of latices added to the dispersion

| Amount of the mixture of latices added to the dispersion (% by weight) | Peel Time after 24 hours (S) |
|---|---|
| 40 | 0 |
| 30 | 8 |
| 20 | 147 |
| 10 | 282 |

Table 2 shows that the degree of tack increased as the treatment level was reduced.

EXAMPLE 18

An artificial "chocolate mousse" was prepared by mixing together 50% by weight of Kuwait crude oil and 50% by weight sea water. 10 g of this "mousse" was treated with 4 g of a mixture of latices which comprised 80% wt/wt natural rubber latex and 20% wt/wt PVC latex. The latices were the same as those used in Example 2. A non-tacky solid was formed within 5 minutes.

EXAMPLE 19

10 g of a mousse of unknown composition produced naturally as a result of an oil spill was treated with 4 g of a mixture of latices which comprised 80% wt/wt natural rubber latex and 20% wt/wt PVC latex. The latices were the same as those used in Example 2. A non-tacky solid was formed within 5 minutes.

EXAMPLE 20

5 kg of the same artificial "chocolate mousse" as used in Example 1 was spread on a plastic sheet to a depth of 5–10 mm. 2 kg of a mixture of latices comprising 80% wt/wt natural rubber latex and 20% wt/wt PVC latex was poured onto the mousse and mixed with the mousse using a garden rake. The latices were the same as used in Example 2. Solidification occurred within 3 minutes and large pieces of "mousse" could be easily lifted from the plastic sheet within one hour.

EXAMPLE 21

5 kg of the same artificial "chocolate mousse" as used in Example 1 was spread on a sand and pebble substrate to a depth of 5–10 mm. 2 kg of a mixture of latices comprising 80% wt/wt natural rubber latex and 20% wt/wt PVC latex was poured onto the "mousse" and mixed using a garden rake. The latices were the same as those used in Example 2. Solidification occurred within 5 minutes. Loose debris was included in the product. Within 2 hours the solid product could be easily lifted and handled. The mousse was recovered leaving a clean surface.

EXAMPLE 22

10 g of the same artificial "chocolate mousse" as used in Example 1 was treated with 4 g of a mixture of latices which comprised 80% wt/wt natural rubber latex and 20% wt/wt of polystyrene latex. The polystyrene latex had a solids content of 40% wt/wt and the natural rubber latex was the same as used in Example 2. A non-tacky solid was formed which had a negligible peel time after 24 hours.

EXAMPLE 23

10 g of the same artificial "chocolate mousse" as used in Example 1 was treated with 4 g of a latex of styrene butadiene rubber having a solids content of 65% solids i.e. the amount of styrene butadiene rubber was 26% by weight of the weight of the "mousse". A solid was formed which had a peel time after 24 hours of 30 seconds.

A second 10 g sample of the "mousse" was treated with 4 g of a mixture of latices which comprised 80% wt/wt of the styrene butadiene rubber latex and 20% wt/wt of the same PVC latex as used in Example 2. A solid was formed which had a peel time after 24 hours of 7 seconds. Thus the use of the mixture of latices produced a less tacky product.

EXAMPLE 24

Three 10 g samples of the same artificial "chocolate mousse" as used in Example 1 were treated with 4 g, 3 g, and 2 g respectively of a latex of poly (methyl methacrylate) graft natural rubber. The quantity of poly (methyl methacrylate) in the latex was 10% by weight of the natural rubber. The solids concentration of the latex was 56% wt/wt.

At each treatment level the latex was mixed with the "mousse" and formed a solid within 5 minutes. At the treatment level of 2 g, i.e. 20% based on the weight of the dispersion, the peel time after 24 hours was found to be about 30 seconds whereas at the higher treatment levels a non-tacky solid was produced having a negligible peel time after 24 hours. Thus the use of the poly (methyl methacrylate) graft natural rubber produced a solid product which was less tacky than the solid produced using a latex of natural rubber alone (cf. Example 2).

EXAMPLE 25

Three 10 g samples of the same artificial "chocolate mousse" as used in Example 1 were treated with 4 g, 3 g and 2 g respectively of a mixture of latices comprising 90% by weight of the same latex of poly (methyl methacrylate) graft natural rubber as used in Example 24 and 10% by weight of the same PVC latex as used in Example 2.

At each treatment level the mixture of latices was mixed with the water-in-oil dispersion and formed a solid. The peel time after 24 hours of the solid formed using 2 g of the mixture of latices was 12 seconds. Thus the inclusion of 10% PVC latex in the mixture of latices reduced the peel time at a 20% treatment level by more than half compared with the use of the poly (methyl methacrylate) graft natural rubber latex alone (cf. Example 24). At the higher treatment levels a non-tacky solid was produced having a negligible peel time after 24 hours.

EXAMPLE 26

A 10 g sample of the same artificial "chocolate mousse" as used in Example 1 was treated with 20% by weight of the same poly (methyl methacrylate) graft natural rubber latex as used in Example 24 and 3% by weight of a china clay filler sold by English China Clay International. The solid produced was found to have a peel time after 24 hours of 16 seconds. Thus the use of the filler had reduced the tackiness of the product compared with the use of the latex alone (cf. Example 24).

EXAMPLE 27

10% wt/wt Toluene was mixed with 90% wt/wt of the same polychloroprene latex used in Example 1. Example 1 was repeated with this mixture in place of the latex used in Example 1. The "mousse" gelled within 5 minutes.

EXAMPLE 28

The polychloroprene latex used in Example 1, toluene and clay filler (sold under the name Devolite by Anchor Chemicals) were mixed together in the proportions 80% by weight polychloroprene latex, 10% by weight toluene and 10% by weight of clay. Example 1 was repeated using this mixture in place of the latex of Example 1. The "mousse" gelled in 1 to 2 minutes.

EXAMPLE 29

A fresh water-in-oil dispersion was prepared by adding together fresh water and F80 Bunker Fuel Oil in a weight ratio of 70:30 and stirring the mixture until a viscous dispersion was formed.

10 g of the dispersion were treated with 4 g at the same latex of poly (methyl methacrylate) graft natural rubber as used in Example 24. The latex and the dispersion were difficult to mix together and there was no appreciable solidification of the dispersion or exudation of water even after 48 hours.

The experiment was repeated except that salt (sodium chloride) was added to the dispersion. The addition of the salt prior to or simultaneously with the addition of the rubber latex resulted in a solid product being formed.

10 g samples of the dispersion were treated with 4 g of the latex of poly (methyl methacrylate) graft natural rubber and solid, particulate salt. Table 3 shows how the time taken to form a solid and the peel times after 24 hours were affected by the salt concentration.

TABLE 3

| Effect of the amount of salt added to a fresh water-in-oil dispersion | | |
|---|---|---|
| Amount of salt % wt/wt on the water present in dispersion | Time taken to from a solid (mins) | Peel time after 24 hours |
| 1 | 120 | 72 |
| 2 | 120 | 16 |
| 6 | 5 | 0 |
| 12 | 5 | 0 |
| 24 | 5 | 0 |
| 48 | solidified on mixing | 0 |

We claim:
1. A method of treating a dispersion of salt water-in-oil comprising mixing the dispersion with a latex of rubber having a high wet gel strength, said dispersion containing oil as the continuous phase and water as the dispersed phase in an amount of 20 to 80% by volume.

2. A method as claimed in claim 1 characterised in that the dispersion is formed as a result of incorporating fresh water into oil and the dispersion is treated with salt in an amount greater than 3% by weight of the weight of the fresh-water in the dispersion, the salt being added prior to or simultaneously with the addition of the latex of a rubber having a high wet gel strength.

3. A method as claimed in either of claims 1 or 2 characterised in that the rubber is natural rubber, polychloroprene rubber, butadiene acrylonitrile polymer rubber, styrene butadiene rubber or a natural rubber having from 5 to 20% by weight poly (methyl methacrylate) chains chemically attached to the rubber.

4. A method as claimed in either of claims 1 or 2 characterised in that the amount of the rubber having a high wet gel strength added to the dispersion is from 5 to 30% by weight of the weight of the dispersion.

5. A method as claimed in claim 4 characterised in that the amount of rubber added to the dispersion is from 8 to 24% by weight of the weight of the dispersion.

6. A method of treating a dispersion of salt water-in-oil comprising mixing with the dispersion a latex of a high wet gel strength rubber and a latex of a polymer having a low or zero wet gel strength, the amount of the latex of the polymer having low or zero wet strength being from 1 to 35% by weight of the combined weight of the rubber and polymer.

7. A method as claimed in claim 6 characterised in that the polymer having a low or zero wet gel strength is poly vinyl chloride, poly (vinyl acetate) or polystyrene.

8. A method as claimed in claim 6 characterised in that the combined amount of the rubber and polymer in the latices added to the dispersion is from 6 to 35% by weight of the weight of the dispersion.

9. A method as claimed in claim 7 characterised in that the combined amount of the rubber and polymer in the latices added to the dispersion is from 8 to 24% by weight of the weight of the dispersion.

10. A method as claimed in claim 6 characterised in that the amount of the low or zero wet gel strength polymer added to the dispersion is from 10 to 25% by weight of the combined weight of the rubber and polymer.

11. A method as claimed in claim 6 characterised in that the amount of the low or zero wet gel strength polymer added to the dispersion is greater than 0.2% by weight of the weight of the dispersion.

12. A method of treating a dispersion of water-in-oil as claimed in either of claims 1 or 2 characterised in that the latex or each latex in a mixture of latices has a solid concentration of from 45 to 60% by weight.

* * * * *

UNITED STATES PATENT AND TRADEMARK OFFICE
CERTIFICATE OF CORRECTION

PATENT NO. : 4,420,573

DATED : DECEMBER 13, 1983

INVENTOR(S) : SIDNEY G. FOGG, FRANK C. ROBERTSON and DOUGLAS WILSON

It is certified that error appears in the above-identified patent and that said Letters Patent is hereby corrected as shown below:

Column 4, line 49, change "Symmintons" to --Symmingtons--.

Column 4, line 50, change "lates" to --latex--.

Column 5, line 60, delete "and".

Signed and Sealed this

Twentieth Day of March 1984

[SEAL]

Attest:

GERALD J. MOSSINGHOFF

Attesting Officer

Commissioner of Patents and Trademarks